(12) United States Patent  
Eigen et al.

(10) Patent No.: US 7,783,932 B1  
(45) Date of Patent: Aug. 24, 2010

(54) METHOD AND APPARATUS FOR GENERATING DYNAMIC MICROCORES

(75) Inventors: David J. Eigen, San Francisco, CA (US); David A. Grunwald, San Francisco, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 802 days.

(21) Appl. No.: 11/735,299

(22) Filed: Apr. 13, 2007

(51) Int. Cl.
*G06F 11/00* (2006.01)

(52) U.S. Cl. .......................................... 714/45; 714/38
(58) Field of Classification Search ................... 714/45
See application file for complete search history.

(56) References Cited

U.S. PATENT DOCUMENTS

| | | | |
|---|---|---|---|
| 6,681,348 B1 * | 1/2004 | Vachon ......................... | 714/45 |
| 7,127,642 B2 * | 10/2006 | Wang et al. .................... | 714/45 |
| 7,496,794 B1 * | 2/2009 | Eastham et al. ................ | 714/37 |
| 7,509,521 B2 * | 3/2009 | Iwakura et al. ................. | 714/5 |
| 2004/0250170 A1 * | 12/2004 | Glerum et al. ................. | 714/38 |

OTHER PUBLICATIONS

Eastham, Paul C., et al., Non-Published U.S. Appl. No. 11/332,031, filed Jan. 13, 2006 entitled "Creating Lightweight Faulty Analysis Records".

* cited by examiner

*Primary Examiner*—Michael C Maskulinski  
(74) *Attorney, Agent, or Firm*—Blakely, Sokoloff, Taylor & Zafman LLP

(57) ABSTRACT

A method of generating a microcore file, which is a subset of a full core dump, for a networked storage system includes generating a microcore file according to a microcore specification, and dynamically defining the microcore specification at runtime of the network storage system. The microcore specification is dynamically defined with information provided by results of an event that triggers the generation of the microcore file. After the microcore specification is defined, a region of a system memory is identified according to the microcore specification. The method further includes dumping the data from the region of the system memory into the microcore file.

30 Claims, 7 Drawing Sheets

```
<memory>
    <start>          — — — — — — — — — —
        <object type="volume">                    |
            <name>$volname</name>                 |~ 550
        </object>                                 |
    </start>         — — — — — — — — — —
    <operations>
        <offset size="0x18" />  ←———————— 551
        <dereference />         ←———————— 552
    </operations>
    <size>
        0x20  ←———————— 553
    </size>
</memory>
```

Figure 5

METHOD AND APPARATUS FOR GENERATING DYNAMIC MICROCORES

FIELD OF THE INVENTION

At least one embodiment of the present invention pertains to a network data storage system, and more particularly, to a technique for generating dynamic microcores at runtime in a network data storage system.

BACKGROUND

Various forms of network-based storage systems exist today. These forms include network attached storage (NAS), storage area networks (SANs), and others. Network storage systems are commonly used for a variety of purposes, such as providing multiple users with access to shared data, backing up critical data (e.g., by data mirroring), etc.

A network-based storage system typically includes at least one storage server, which is a processing system configured to store and retrieve data on behalf of one or more client processing systems ("clients"). A storage server may be a file server, which is sometimes called a "filer". A filer operates on behalf of one or more clients to store and manage shared files. The files may be stored in a storage subsystem that includes one or more arrays of mass storage devices, such as magnetic or optical disks or tapes, by using RAID (Redundant Array of Inexpensive Disks). Hence, the mass storage devices in each array may be organized into one or more separate RAID groups.

For performance monitoring and debugging purposes, the operating system of a storage system may at specific times generate a core dump that includes an image of the system memory. A core dump is typically generated when the operation of the system is terminated abnormally. A core dump can also be generated periodically or when it is necessary to diagnose certain performance problems of the system.

A full core dump is generally multi-gigabytes in size. In addition to the system memory image, a full core dump usually includes other key information of the system state, including contents of the processor registers, memory management information, and processor and operating system information such as counters and flags. Due to the file size, transferring the core dump to a remote support center for reporting and analysis poses a problem. One conventional technique is to require a user to upload the core dump to the service provider's File Transfer Protocol (FTP) sites. The upload may take a long time and may cause network congestion.

In addition to the file size, the generation of a core dump often causes a storage system to go offline until it is rebooted. For example, a system administrator may cause a core dump by using a halt command or other suitable commands. A core dump may be generated when a system anomaly occurs. In these scenarios, a panic procedure is typically invoked to switch the system into a uniprocessor mode to lock out other threads from running. After a core dump is generated, the system needs to be rebooted. As a result, the availability of the storage system is reduced because of the down time.

SUMMARY OF THE INVENTION

The present invention includes a method and apparatus for generating a microcore file. In one embodiment, the method includes generating a microcore file according to a microcore specification, the microcore file being a subset of a full core dump; dynamically defining, at runtime of the network storage system, the microcore specification with information provided by results of an event that triggers generation of the microcore file; and dumping data from a region of a system memory of the network storage system into the microcore file according to the microcore specification.

A microcore file includes a subset of a full core dump. A microcore specification, which is dynamically defined at runtime, provides instructions for generating the microcore file. A microcore file is designed to include the contents of a specific memory structure to address a specific issue. The microcore file provides system information that allows existing or potential problems of the system to be quickly identified. Unlike a full core dump, a microcore file is small (e.g., a few megabytes) and, therefore, can be easily transferred to a remote site. Moreover, a microcore file is generated while the system is online. Thus, a system administrator does not need to bring down the system when generating the microcore file.

Other aspects of the invention will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which:

FIG. 5 shows an example of a portion of a microcore specification; and

DETAILED DESCRIPTION

Figure 1:
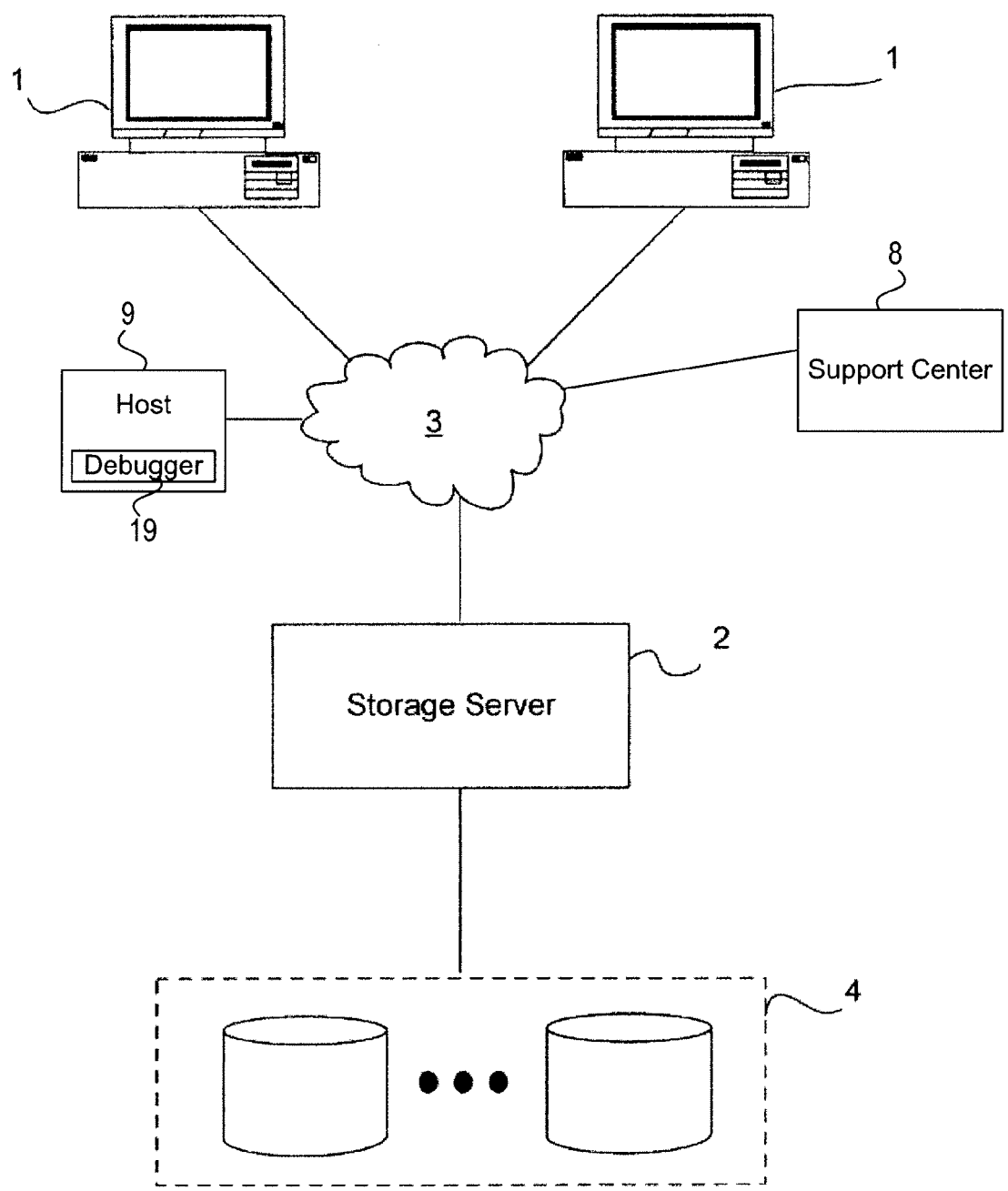
FIG. 1 illustrates a network environment which includes a storage server.

A method and apparatus for generating dynamic microcore files in a storage system are described. References in this specification to "an embodiment", "one embodiment", or the like, mean that the particular feature, structure or characteristic being described is included in at least one embodiment of the present invention. However, occurrences of such phrases in this specification do not necessarily all refer to the same embodiment.

The term "microcore" or, equivalently, "microcore file," as used herein, refers to a subset of a full core dump. A "full core dump" herein refers to a point-in-time image of the system memory. A microcore file is generated according to a microcore specification, which is dynamically defined at runtime. A microcore file is designed to include the contents of a specific memory structure to address a specific issue. The microcore file provides system information that allows existing or potential problems of the system to be quickly identified. Unlike a full core dump, a microcore file is small (e.g., a few megabytes) and, therefore, can be easily transferred to a remote site. Moreover, a microcore file is generated while the system is online. Thus, a system administrator does not need to bring down the system when generating the microcore file.

One aspect of the technique introduced here, as further described below, is that the microcore specifications can be loaded to a live storage server and dynamically defined at runtime. It is not necessary to compile the microcore specifications into the operating system kernel before generating the microcores. Thus, a system administrator or a service provider can configure the microcore specification according to the issues encountered in real time. These real-time issues may include, but are not limited to, insufficient space in a volume, a disk failure, file system corruption, any operational anomalies, and slow performance.

Another aspect of the technique, as further described below, is that the microcore files are substantially smaller than a full core dump, which generally is gigabytes in size. Thus, a microcore file typically contains only a few megabytes of the system memory. The compactness allows the microcore file to be easily transferred to a support center for reporting or analysis. For example, a microcore file can be sent to a support center by email. Moreover, customers who have sensitive data in the memory of a server may not want to send full core dumps to a customer support, but may be willing to send audited microcore files. Using the techniques described below, customers will have the ability to specify the memory locations from which a microcore file collects information.

In certain embodiments of the invention, the microcore generation functionality is linked to a reporting tool that automatically packages and transfers the microcore files to a support center without any human interaction. An example of the automatic reporting tool is AutoSupport™, which is a product of Network Appliance, Inc. (NetApp®) of Sunnyvale, Calif. As another example, a system can send a notification to a support center after a microcore file is generated. In response to the notification, the support center will retrieve the microcore file over the network. Alternatively, data contained in the microcore files may be automatically processed at a local site, e.g., by comparing the data with a local bug database that includes information of known bugs.

Before further discussing this technique, it is useful to discuss certain background information and to define certain terminology. In some conventional storage servers, data is stored in logical containers called volumes and aggregates. These logical containers can be managed by an operating system configured to provide stage services, e.g., Data ONTAP®, available from Network Appliance, Inc. of Sunnyvale, Calif. An "aggregate" is a logical container for a pool of storage, combining one or more physical mass storage devices (e.g., disks) or parts thereof into a single logical storage object, which contains or provides storage for one or more other logical data sets at a higher level of abstraction (e.g., volumes). A "volume" is a set of stored data associated with a collection of mass storage devices, such as disks, which obtains its storage from (i.e., is contained within) an aggregate, and which is managed as an independent administrative unit.

A storage server maintains various hierarchical data structures, called buffer trees, to keep track of the organization of blocks stored in an aggregate. The root of the buffer tree is known as an "inode", which is a metadata structure that contains metadata about the file represented by the buffer tree. Each buffer tree typically references numerous blocks. Each block in an aggregate can be identified by an address. In an embodiment of the invention, an aggregate is represented (implemented) as a volume. An active map of a volume indicates the addresses of those blocks which are currently used (allocated) in an active file system. The storage server also maintains a volume structure associated with each volume for processing file system operations or upkeep of the file system.

An example of a volume structure is volume_structure. A volume structure typically includes, but is not limited to, pointers to relevant buffers, pointers to structures needed by RAID (e.g., RAID tree, topology), pointers to inodes for various metadata files (e.g. active map, summary map, etc.), a file system ID that uniquely identifies the volume, the mount state of the volume (e.g., whether the volume is mounting, mounted, etc.), message queues for messages that suspend for various reasons related to the volume, various states and pointers related to the volume, and per-volume statistics for the volume. The relevance of these structures to the technique introduced here is discussed below.

The volume structure is used extensively during the operation of the storage server. Thus, for various analysis or diagnostic purposes, a microcore file is often generated to include the contents of a volume structure. For example, to perform a write allocation, the storage server consults an active map of a volume to find out which blocks in the volume are currently in use. To find the active map for a volume, the storage server follows the pointer to the active map's inode in the volume structure. While processing a write, the storage server needs to know whether there is enough space on the volume to complete the write. To find the amount of space available, the storage server consults the space accounting structures in the volume structure. When reading from a point-in-time image of stored data (hereinafter "snapshot", without derogation of any trademark rights of Network Appliance, Inc.), the storage server needs to find the root of the buffer tree for the snapshot's file system. The information in the volume structure contains the file system root necessary for the storage server to complete the read.

The following examples illustrate a few situations where the contents of a volume structure may be copied into a microcore file for analysis or diagnostic purposes. For example, an event management system (EMS) event (described below) occurs indicating that a volume has run out of space. However, a user or a user with administrative privileges may suspect that the volume still has free space but some other anomaly has occurred. The user may find out the amount of free space in the volume by causing the storage server to dump the space accounting structure in the volume structure into a microcore. As another example, if the storage server periodically produces zero throughput, a user or a user with administrative privileges may suspect that there are messages suspended in the message queues for the storage server to complete consistency point maintenances (e.g., committing cached data to long-term storage, such as disks). Examples of the message queues may include a receive queue of a message processing thread, or wait queues used to wait on loading blocks from a disk. To obtain a list of the suspended messages in the message queues, the user may cause the storage server to dump the contents of the message queues into a microcore file.

FIG. 1 shows a simple example of a network environment which incorporates a storage server 2, which can be a file server or "filer", in which the technique introduced here can be implemented. Note that the technique can also be applied in other types of storage systems, such as storage servers which provide clients with block-level access to stored data or processing systems other than storage servers, and network devices configured to provide storage services. Although the terms "storage system" and "storage server" are used throughout the descriptions, the technique described below can also be applied to any computer systems, including but not limited to, personal computers, networked computing nodes, laboratory machines, Web servers, portable computing devices, personal digital assistants (PDAs), and embedded devices.

Referring to FIG. 1, the storage server 2 is coupled to a storage subsystem 4 which includes a set of mass storage devices, and to a set of storage clients 1 (hereinafter simply "clients") through a network 3. The network 3 may be, for example, a local area network (LAN), a wide area network (WAN), a global area network (GAN) such as the Internet, a Fibre Channel fabric, or a combination of such networks. Each of the clients 1 may be, for example, a conventional personal computer (PC), server-class computer, workstation, or the like. The storage server 2 is also coupled to a remote support center 8 via the network 3. The support center 8 provides technical support to ensure proper operations of the storage server 2. The support center may be operated by the manufacturer of the storage server 2, for example.

The storage subsystem 4 is managed by the storage server 2. The storage server 2 receives and responds to various read and write requests from the clients 1, directed to data stored in or to be stored in the storage subsystem 4. The mass storage devices in the storage subsystem 4 may be, for example, conventional magnetic disks, optical disks such as CD-ROM or DVD based storage, magneto-optical (MO) storage, or any other type of non-volatile storage devices suitable for storing large quantities of data.

Although illustrated as a self-contained element, the storage server 2 may have a distributed architecture; for example, it may include a separate N- ("network") module and D- ("data") module (not shown). In such an embodiment, the N-module is used to communicate with clients 1, while the D-module includes the file system functionality and is used to communicate with the storage subsystem 4. The N-module and D-module can communicate with each other using an internal protocol. Alternatively, the storage server 2 may have an integrated architecture, where the network and data components are all contained in a single box. The storage server 2 may also be coupled through a switching fabric to other similar storage servers (not shown), which have their own local storage subsystems. In this way, all of the storage subsystems can form a single storage pool, to which any client of any of the storage servers has access.

The storage server 2 is coupled to a host 9 (e.g., a desktop or a lab machine), which can be remote or local. A debugger 19 is run on the host 9. In some scenarios, the debugger 19 can be used as a backend tool for creating the microcore specification 27. Other tools, such as the debugger 19 or the like, for creating the microcore specification 27 can also be used. The microcore specification 27 created by the debugger 19 can be uploaded to the storage server 2. The debugger 19 will be described below with reference to FIG. 3 and FIG. 4.

Figure 2A:
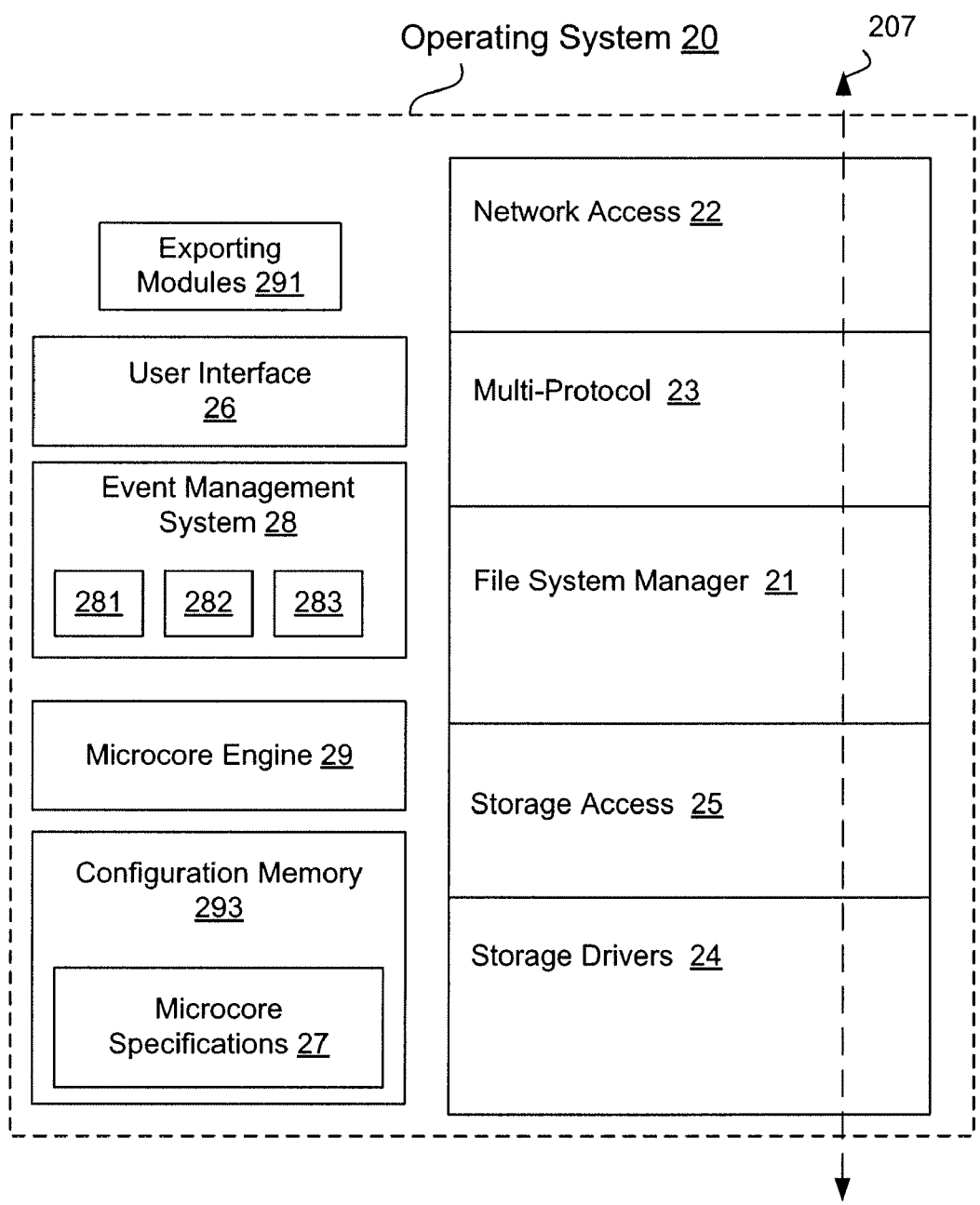
FIG. 2A illustrates the architecture of the operating system of the storage server.

The storage server 2 includes an operating system 20 to control its operation, an example of which is shown in FIG. 2A. The operating system 20 and its constituent elements are preferably implemented in software. However, in some embodiments, some or all of the elements of the operating system may be implemented in hardware (e.g., specially designed circuitry), or as a combination of hardware and software. A skilled person in the art would appreciate that the dynamic microcore generation technique can be implemented by any operating systems that run on any computing platforms.

As shown, the operating system 20 includes several modules, or "layers". These layers include a file system manager 21. The file system manager 21 is software that manages the one or more file systems managed by the storage server 2. In particular, the file system manager 21 imposes a hierarchy (e.g., a directory/file structure) on the data stored in the storage subsystem 4 and manages client-initiated read and write operations at a high level (while delegating certain functions to lower layers of the operating system 20).

To allow the storage server 2 to communicate over the network 3 (e.g., with clients 1 and the support center 8), the operating system 20 also includes a network access layer 22, and a multi-protocol layer 23 operatively coupled between the file system manager 21 and the network access layer 22. The multi-protocol layer 23 implements a number of higher-level network protocols, such as Network File System (NFS), Common Internet File System (CIFS) and/or Hypertext Transfer Protocol (HTTP) running over Transmission Control Protocol/Internet Protocol (TCP/IP); and/or Internet SCSI (iSCSI) and/or Fibre Channel Protocol (FCP). The network access layer 22 includes one or more drivers which implement one or more lower-level protocols to communicate over the network, such as Ethernet or Fibre Channel.

To enable the storage server 2 to communicate with the storage subsystem 4, the operating system 20 includes a storage driver layer 24, and a storage access layer 25 operatively coupled between the file system manager 21 and the storage driver layer 24. The storage access layer 25 implements a higher-level disk storage protocol, such as RAID-4, RAID-5 or RAID-DP, while the storage driver layer 24 implements a lower-level storage device access protocol, such as Fibre Channel Protocol (FCP) or SCSI. The storage access layer 25 is alternatively called the "RAID layer" in this description.

Also shown in FIG. 2A is the path 207 of data flow, through the operating system 20, associated with a client-initiated read or write request.

The operating system 20 also includes a user interface 26 to generate a command line interface (CLI) and/or graphical user interface (GUI), to allow administrative control and configuration of the storage server 2, from a local or remote terminal. Commands to generate a microcore file can be entered through these interfaces.

The operating system 20 includes a kernel to manage the storage system's resources and the communication between hardware and software components. The kernel includes an event management system (EMS) 28 that supports creation, forwarding, and consumption of event indications. The EMS 28 is operatively coupled to every component of the operating system 20. For example, the EMS 28 interfaces with the file system manager 21 to write an EMS log into a designated location in the storage subsystem 4. The EMS 28 also interacts with the user interface 26 to print messages on a console. Generally, the EMS 28 includes three distinct entities: an event producer 281, an event engine 282, and an event consumer 283. The event producer 281 determines that an event has occurred and creates an event indication containing information describing the event. For example, an EMS event occurs when a snapshot cannot be generated, when a volume is running out of space, when a disk fails, when corruption of the file system is detected, when the system is about to crash, or when any abnormal event (e.g., a power outage, a fault, or security violation) occurs in the storage server 2. Alternatively, an EMS event may be generated to notify a management station of the occurrence of a significant event, which does not involve any abnormal activities. An EMS event may also occur periodically at a predetermined interval to generate an EMS log for performance monitoring purposes.

The EMS engine 282 receives event indications from the EMS producer 281. The EMS engine 282 is responsible for forwarding the event indications to the event consumer 283 based on filtering descriptions. The event consumer 283 registers with the EMS engine 282 to receive event indications based on the filtering descriptions. Typical event consumers 283 include, but are not limited to, general-purpose logging, system log generation, Simple Network Management Protocol (SNMP) trap generation, AutoSupport™ generation, and application-specific event correlation mechanisms.

Figure 2B:
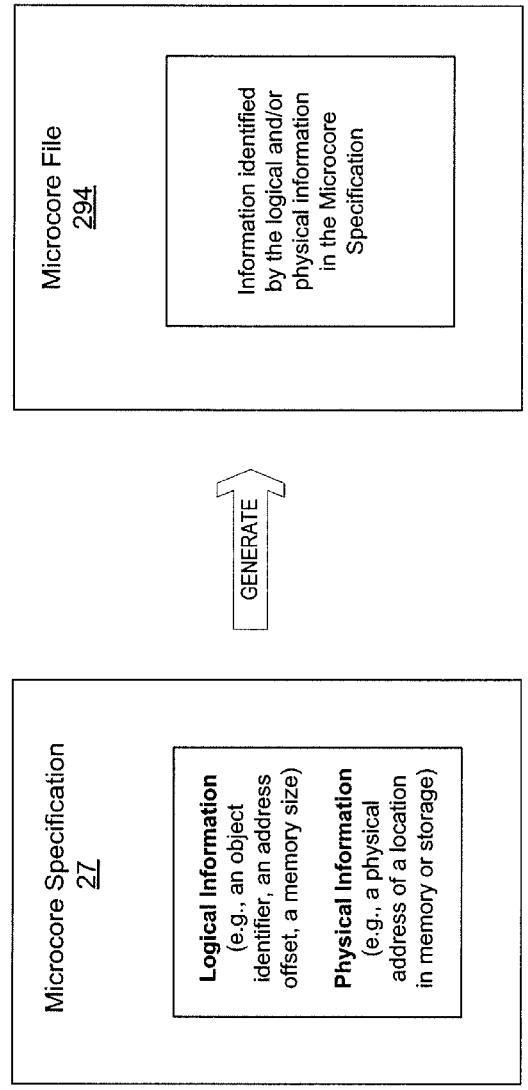
FIG. 2B illustrates a block diagram of a microcore specification and a microcore file generated by the microcore specification.

In one embodiment, the operating system 20 also includes a microcore engine 29 that generates microcores. The microcore engine 29 is operatively coupled to the EMS 28, the user interface 26, and other components of the operating system 20. The microcore engine 29 has access to a configuration memory 293, which stores one or more microcore specifications 27. Referring to FIG. 2B, the microcore specifications 27 include logical information that specifies an object, e.g., a memory structure or a file, in memory or storage. Logical information, for example, includes an object identifier that identifies an object in memory or storage, an address offset, or a size. The object's physical address in memory or storage is determined at runtime. The microcore specifications 27 may also include physical information, e.g., a physical address of a memory or a storage location of an object. It is not necessary to include physical addresses in the microcore specifications 27. It is, however, possible to provide physical addresses to the microcore specification 27 at runtime if desired. FIG. 2B also shows an example of a microcore file 294 generated according to the microcore specification 27. The microcore file 294 includes contents of a location in memory or storage specified by the logical and/or physical information in the microcore specification 27. Illustratively, the microcore file 294 includes, but is not limited to, contents of a volume structure, contents of a memory structure related to an inode or a buffer, log files or a portion thereof, portions of system metadata, or any information collected from memory or storage.

In certain embodiments, the operating system 20 also includes exporting modules 291 for locating dynamically allocated objects. The exporting modules 291 will be described later with reference to FIGS. 3 and 4.

The EMS log generated by the EMS 28 is substantially different from the microcores. An EMS log includes limited information, such as a name or number specifying an object. The specification for generating the EMS log is compiled with the operating system code. Thus, the information in an EMS log is static with respect to an EMS event. Microcores include much more detailed information about an object, related objects, global state of the system, or state of the thread executing at the time the EMS was produced. Furthermore, microcore specifications can be dynamically defined, or configured, by an event at runtime.

As an example, when an EMS event occurs due to a full volume, the EMS log merely provides a string that indicates the name of the volume. Based on the string, the microcore can dump the volume structure of the full volume, as well as the stack back-trace at the point where the EMS event was generated. Thus, a user or a user with system administrative privileges is able to know not only the function executed by the system at the time of the EMS event, but also how the system gets to that point.

As another example to illustrate the versatility of the microcores, microcores may be generated in response to EMS events that involve specific inodes or buffers. Suppose an EMS event generates an inode number or a buffer number. The microcores can dump memory structures related to the inode or buffer. If further information relating to the memory structure is necessary, the microcores can dump lists of messages queued on certain queues, e.g., a receive queue of a message processing thread, or wait queues used to wait on loading blocks from a disk.

A notable feature of the microcore specifications 27 is that it is unnecessary to compile the microcore specifications 27 into the operating system 20. Unlike specifications for EMS logs and core dumps, which are hard-coded into the operating system 20, the microcore specifications 27 can be modified in real time, at runtime of the storage server, to diagnose a particular issue. Variables in the microcore specifications 27 can be dynamically configured to different values according to the results generated by an event at runtime (details provided below). Thus, the microcore specifications 27 can be written at a source code level and mapped to different memory regions according to the events generated.

Figure 3:
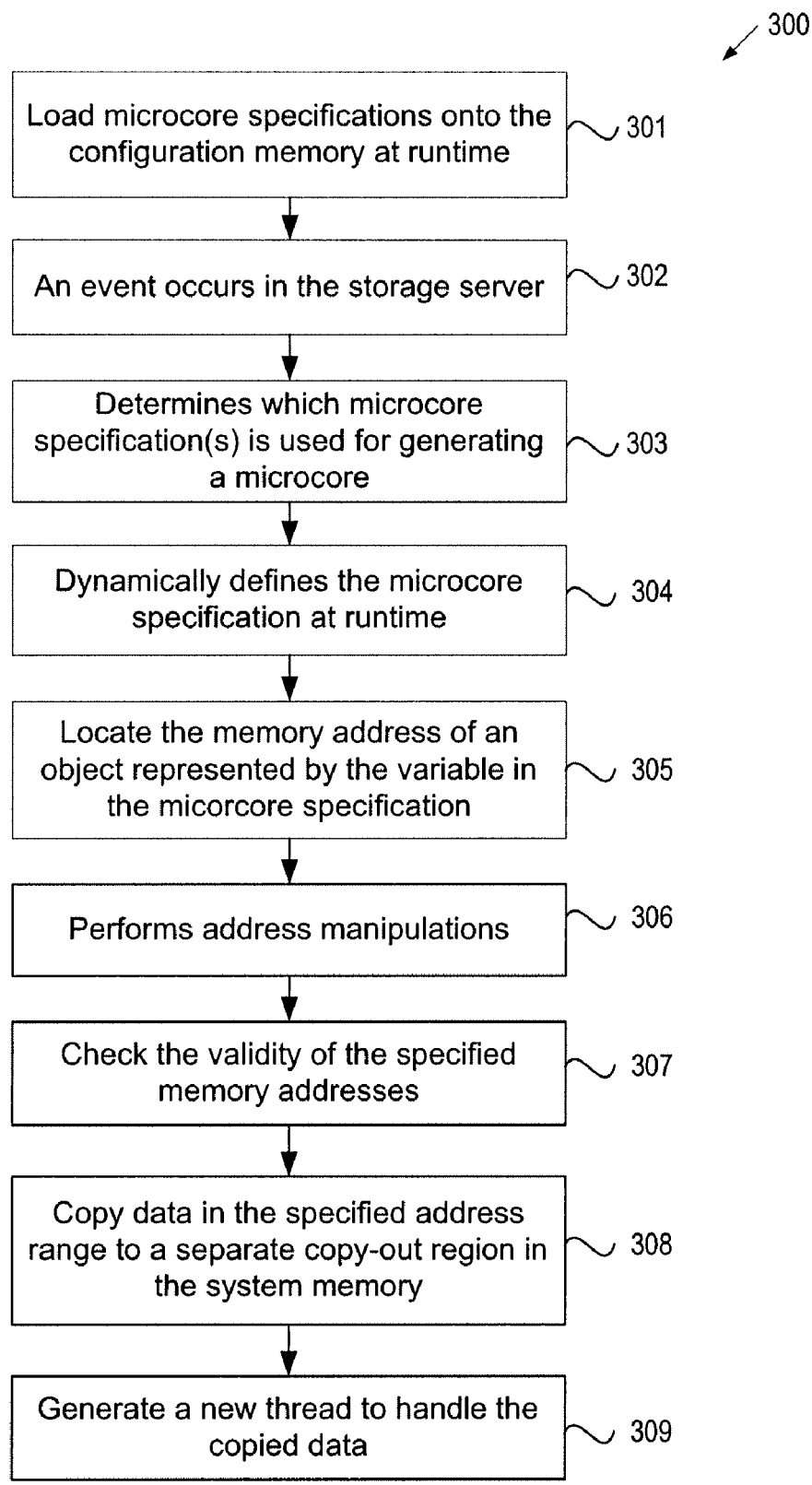
FIG. 3 shows a process for generating a microcore file.

FIG. 3 illustrates an example of a process 300, which may be performed by the microcore engine 29 to generate microcores. Initially, at 301, the microcore specifications 27 are loaded onto the configuration memory 293 at runtime of the storage server 2 via the network 3 or via a local data connection. The microcore specifications 27 are typically provided by a service provider, e.g., the support center 8 of FIG. 1. However, the microcore specifications 27 may also be generated locally at the site of the storage server 2. Each of the microcore specifications 27 may be written to address a specific issue, or included in a default configuration to address commonly encountered issues. Additional microcore specifications can be provided, modified, or read at any point of the process 300 during runtime. For example, after an initial diagnosis reveals that a particular volume is at fault, the support center 8 may upload additional microcore specifications to debug various structures in that particular volume.

At 302, a triggering event occurs in the storage server 2. Each triggering event may trigger the generation of one or more microcores according to one or more microcore specifications 27. Examples of a triggering event include, but are not limited to, an EMS event, pre-determined time interval, a user or a user with administrative privileges command entered locally or remotely (e.g., via a remote shell (rsh)) requesting the generation of a microcore, and a command invoked by an API at the client side (e.g., a Zephyr Application Program Interface (ZAPI) command). Using the command line, a user or a user with administrative privileges may control the generation of microcores at a particular point in time when the user wishes to find certain information of the storage server 2. The command line trigger can be automated. For example, if an application interfacing through ZAPI detects an anomaly, the application can trigger a microcore dump through ZAPI. In another scenario where the microcore is generated periodically (e.g., every 5 minutes) for debugging a performance problem, a microcore triggering command can be run through a remote shell (rsh) periodically.

After being triggered by an event, at 303, the microcore engine 29 determines which one or more of the microcore specifications 27 are used for generating a microcore. To determine which microcore specification(s) 27 should be used, the microcore engine 29 may refer to the identifier(s) provided by an instruction received from user interface 26 or from a file. The instruction indicates an association between one or more of the specifications 27 and an event. For example, the association between a microcore specification <specfile> and an EMS event <ems.event.name> may be defined by the following instruction:

microcore ems add <ems.event.name> <specfile> volname=vol

Here, the "microcore" command has a subcommand "ems", which itself has a subcommand "add." These commands associate the microcore specification <specfile> with the EMS event <ems.event.name>. Upon the occurrence of the EMS event <ems.event.name>, the EMS parameter "vol"

is substituted for the variable "volname" in the microcore specification <specfile>. In certain embodiments, the EMS parameter "vol" is a volume name or a file space identifier (fsid), which can be used by a volume iterator to locate the volume structure of the identified volume.

The variable binding described above can also be performed according to an event-triggering command. The command provides information that specifies variable substitution. An example of an event-triggering command is as follows:

microcore trigger <specfile> volname=myvolume

This command triggers the microcore specified by the file <specfile>, binding the variable volname to the literal string "myvolume."

After the microcore specification(s) 27 is/are determined and located, at 304, the microcore engine 29 dynamically defines the microcore specification at runtime of the storage server. The microcore specification 27 is defined by binding the variables in the specification to a value. The variable binding may be performed by replacing the variable in the specification with a string of the corresponding EMS parameter. In the above example, the variable "volname" in the microcore specification <specfile> is replaced by the EMS parameter "vol."

For example, a microcore specification may include a code segment, in an Extensible Markup Language (XML)-based format or other data format, to specify a volume object represented by the variable "volname":

<object type="volume">
<name>$volname</name>
</object>

The object type "volume" specifies the type of object to locate, which is, illustratively, a "Write Anywhere File Layout" (WAFL) volume structure in this case. The variable $volname can be replaced with a string, such as an EMS parameter string "vol," according to the above instruction that associates the EMS event with the specification.

At 305, the microcore engine 29 locates the memory address of the object represented by the variable (e.g., volname). The microcore engine 29 runs exporting modules 291 to locate the addresses of dynamically allocated objects (e.g., volume structures) using run time information. One of the exporting modules 291 is a volume iterator, which receives the volume identifier and returns the location of the identified volume structure.

After the microcore engine 29 finds the specified object, at 306, the microcore engine 29 performs address manipulations according to the microcore specification 27. At 307, the microcore engine 29 checks the validity of the memory addresses specified by the microcore specification 27. Details of the address manipulations and validity checking will be described with reference to FIG. 4. At 308, the microcore engine 29 copies data in the specified address range to a separate copy-out region in the system memory. To synchronize the copied data with the system memory, in one embodiment, processes are not allowed to modify the system memory until the copying operation is completed. As the size of the microcore is generally small, the copying operation does not cause any noticeable performance issues. At 309, the microcore engine 29 schedules a new thread to handle the copied data. The copied data may be written into storage (e.g., disks) as a microcore file and/or transferred to the support center 8. If the triggering event was an EMS event generated by a thread, the thread continues from the point when the EMS event occurred. The new thread is then executed to handle the copied data.

Figure 4:
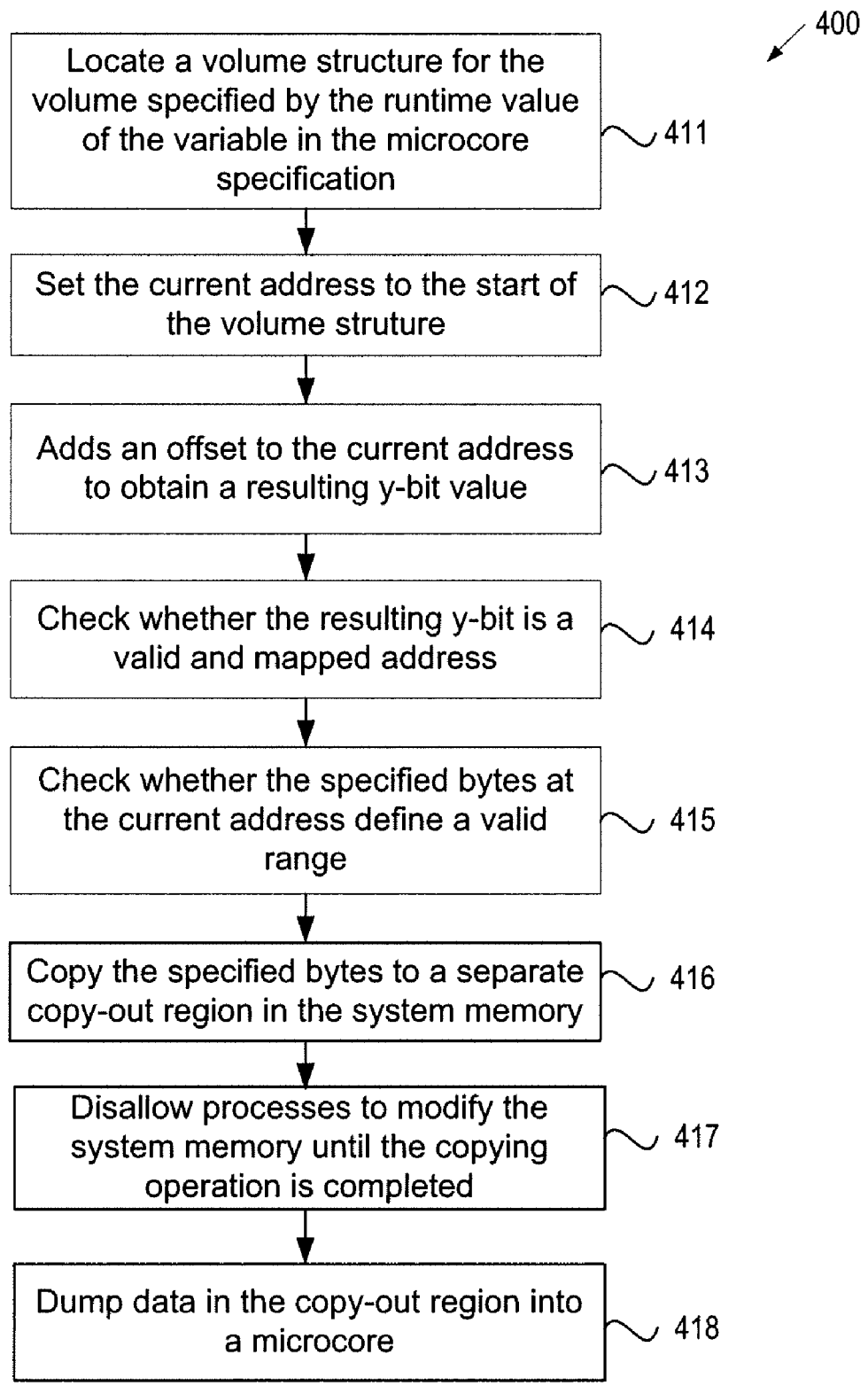
FIG. 4 shows a process for performing address manipulations in the microcore generation.

FIG. 4 illustrates an example of a process 400, which may be performed by the microcore engine 29 to manipulate memory addresses, as mentioned above at 306 and 307 of FIG. 3. The process 400 locates the memory region that contains the data to be dumped out into the microcore according to a microcore specification 500, as shown by example in FIG. 5. The microcore specification 500, in this example, is in an XML format that contains logical address information.

At 411, according to a 550 block of the microcore specification 500, the microcore engine 29 uses a volume iterator to locate the volume structure (e.g., volume_structure) for the volume specified by the runtime value of $volname. At 412, the microcore engine 29 sets the current address to the start of the volume_structure. At 413, according to a 551 block (the <offset> instruction), the microcore engine 29 adds an address offset 0x18 to the current address to obtain a resulting y-bit value. Depending on the platform on which the microcore engine 29 runs, y may be 32, 64, or other values. At 414, according to a 552 block (the <dereference> instruction), the microcore engine 29 checks whether the resulting y-bit is a valid address and mapped address. The process of checking for validity may, depending on the platform, involve consulting various memory mapping tables (e.g., the virtual memory implementation), and/or memory allocation implementations. If the resulting y-bit is valid and mapped, the microcore engine 29 marks the y-bit value as the new current address.

At 415, according to a 553 block, the microcore engine 29 checks whether the 0x20 (in decimal, 32) bytes at the current address define a valid range, and whether everything in that range is valid (e.g., addressable and mapped). At 416, if the current address and the range are both valid, the microcore engine 29 copies the 0x20 bytes at the current address to a separate copy-out region in the system memory. To synchronize the copied data with the system memory, at 417, processes are not allowed to modify the system memory until the copying operation is completed. At 418, the data in the copy-out region of the system memory is dumped into a microcore. The microcore file may be analyzed locally or transferred to a remote site (e.g., the support center 8) for reporting and analysis.

In the examples shown in FIG. 3 and FIG. 4, the physical memory address of a volume structure is located by a volume iterator, which is one example of the exporting modules 291 of FIG. 2A. Each exporting module 291 is a small module that can locate (or "export") dynamically allocated objects based on a type and a set of identifiers specified in the microcore specification. For example, the volume iterators can be used to locate a volume structure given a name or fsid. Another example of the exporting modules 291 is buffers (i.e. in-core blocks) specified by volume and block number. The exporting modules 291 can be easily added whenever necessary.

An advantage of dynamic microcores is that only a few objects need to be exported to obtain a large amount of information. Many memory structures can be found from just a few types of structures (e.g., volume structures, inodes, buffers, etc.). This is in contrast to, e.g., counter exporting used by some conventional techniques, where each statistical data or counter needs to be added explicitly.

In some scenarios where memory is statically allocated to a source-level object, the debugger 19 (e.g., the GNU debugger (gdb)) of FIG. 1 may be used for mapping the object to a memory address. The term "static allocation" herein generally refers to compile-time memory allocation, as opposed to dynamic allocation, such as malloc in C code. The debugger 19 is one possible implementation of a backend tool that creates microcore specifications 27 using source-level descriptions of objects. It is understood that the tool for creating the microcore specification is not limited to the debugger 19.

The debugger 19 can be used to resolve a number of issues, including but not limited to, manipulate static address/pointer (e.g., compute offsets of a field relative to the start of the structure), and obtain addresses of objects that were allocated statically. The memory addresses and offsets can be used in microcore specifications to specify a memory region allocated to an object (e.g., a volume structure). Thus, the debugger 19 allows a user (e.g., an engineer) or a user with administrative privileges to translate source-level descriptions of objects into microcore specifications that can be uploaded to the storage server 2.

For example, the debugger 19 may be used to create at least a portion of the microcore specification 500 of FIG. 5, such as the offset value 0×18 and the address range 0×20. Suppose that the offset and range in the microcore specification 500 specify a memory region allocated to an active map for a volume. Thus, the offset value 0×18 corresponds to the field for the active map, and the value 0×20 corresponds to the address range for the active map. When creating the microcore specification 500, a user or a user with administrative privileges merely needs to provide source-level descriptions of the active map to the debugger 19, and the debugger 19 will find the address values based on the source-level descriptions. It is understood that the address values in the microcore specification 500 have been simplified for the purpose of Illustration.

Figure 6:
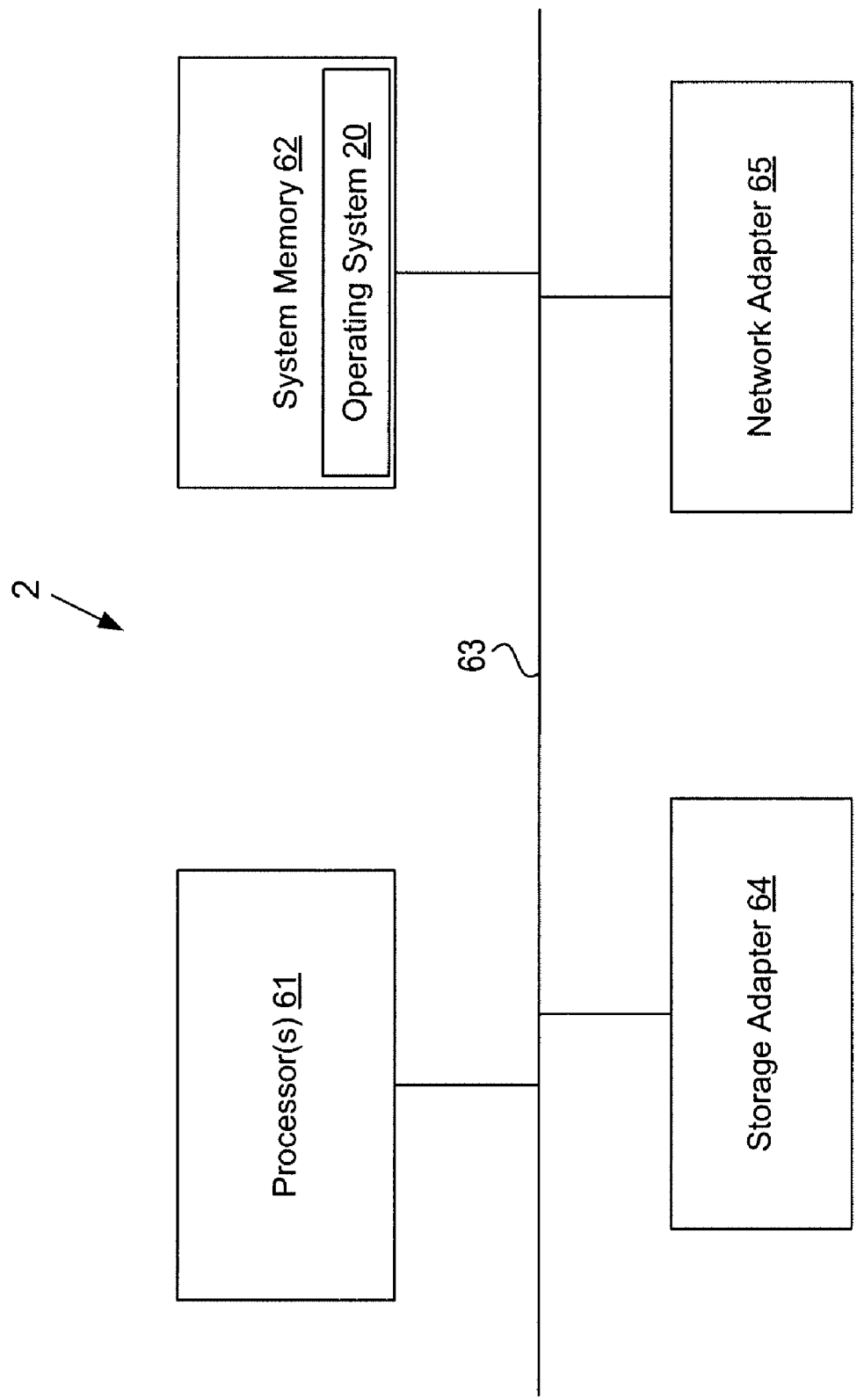
FIG. 6 shows an example of the hardware architecture of the storage server.

FIG. 6 is a block diagram showing an example of the architecture of the storage server 2 at a high level. Certain standard and well-known components which are not germane to the present invention are not shown. The storage server 2 includes one or more processors 61 and memory 62 coupled to a bus system 63. The bus system 63 shown in FIG. 6 is an abstraction that represents any one or more separate physical buses and/or point-to-point connections, connected by appropriate bridges, adapters and/or controllers. The bus system 63, therefore, may include, for example, a system bus, a form of Peripheral Component Interconnect (PCI) bus, HyperTransport or industry standard architecture (ISA) bus, small computer system interface (SCSI) bus, universal serial bus (USB), Inter-IC (I2C) bus, or Institute of Electrical and Electronics Engineers (IEEE) standard 1394 bus (sometimes referred to as "Firewire").

The processors 61 are the central processing units (CPUs) of the file server 2 and, thus, control its overall operation. In certain embodiments, the processors 61 accomplish this by executing software stored in memory 62. Such processor 61 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 62 includes the main memory of the file server 2. Memory 62 represents any form of random access memory (RAM), read-only memory (ROM), flash memory, or the like, or a combination of such devices. Memory 62 stores (among other things) the storage server's operating system 20, which can implement the technique introduced herein.

Also connected to the processors 61 through the bus system 63 are a storage adapter 64 and a network adapter 65. The storage adapter 64 allows the file server 2 to access the storage subsystem 4 and may be, for example, a Fibre Channel adapter or a SCSI adapter. The network adapter 65 provides the storage server 2 with the ability to communicate with remote devices, such as the clients 1, over a network and may be, for example, an Ethernet adapter, a Fibre Channel adapter, or the like.

Thus, a method and apparatus for generating microcores in a storage system has been described. Software to implement the technique introduced here may be stored on a machine-readable medium. A "machine-accessible medium", as the term is used herein, includes any mechanism that provides (i.e., stores and/or transmits) information in a form accessible by a machine (e.g., a computer, network device, personal digital assistant (PDA), manufacturing tool, any device with a set of one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic", as used herein, can include, for example, hardwired circuitry, programmable circuitry, software, or any combination thereof.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method of operating a system, the method comprising:
   generating a microcore file according to a microcore specification, the microcore file being a subset of a full core dump;
   dynamically defining, at runtime of the system, the microcore specification with information provided by results of an event that triggers generation of the microcore file; and
   dumping data from a region of a system memory of the system into the microcore file according to the microcore specification.

2. The method as recited in claim 1, wherein generating a microcore file comprises:
   accessing the microcore specification that includes a variable whose value is defined at runtime;
   locating a memory address assigned to an object represented by the variable; and
   calculating from the memory address to determine the region of the system memory.

3. The method as recited in claim 1, wherein dumping data from a region of a system memory comprises:
   dumping the data relating to a memory structure for an object identified by the event.

4. The method as recited in claim 1, further comprising:
   copying the data into a separate memory region reserved for microcore generation; and
   preventing all other processes from modifying the system memory until the copying is completed.

5. The method as recited in claim 1, wherein generating a microcore file comprises:
   accessing, at runtime, a first microcore specification for a memory structure that includes a plurality of sub-structures; and
   according to results of a first microcore file generated from the first microcore specification, accessing a second microcore specification for one of the sub-structures at runtime.

6. The method as recited in claim 1, wherein generating a microcore file comprises:

accessing a plurality of microcore specifications at runtime; and dynamically determining, at runtime, one or more of the plurality of microcore specifications to use for generation of the microcore file.

7. The method as recited in claim 1, wherein the event that triggers generation of the microcore comprises a command requesting generation of the microcore files.

8. The method as recited in claim 1, wherein the event that triggers generation of the microcore comprises an event detected by an event management system (EMS) of the system.

9. The method as recited in claim 1, further comprising:
using a debugger to map a source-level object to a memory address; and
using the memory address to create at least a portion of the microcore specification.

10. A method as recited in claim 1, wherein generating a microcore file comprises:
using runtime information to locate a memory address of a dynamically-allocated object; and
using the memory address to determine the region of the system memory to dump into the microcore file.

11. The method as recited in claim 1, wherein the system is a network storage system.

12. The method as recited in claim 1, wherein the microcore specification includes commands to collect data stored in a storage device of the system.

13. The method as recited in claim 1, further comprising:
automatically comparing data in the microcore file with a bug database of the system.

14. A storage server comprising:
a storage interface through which to access a mass storage subsystem;
an event generator that generates an event triggering generation of a microcore file, which is a subset of a full core dump; and
a microcore engine, coupled to the event generator, to generate the microcore file in response to the event according to one or more microcore specifications that are dynamically defined at run time with information provided by results of the event.

15. The storage server as recited in claim 14, further comprising:
an event management system that monitors a status of the mass storage subsystem through the storage interface and to produce the event that triggers generation of the microcore file.

16. The storage server as recited in claim 14, further comprising:
a user interface to receive a command that produces the event triggering generation of the microcore file.

17. The storage server as recited in claim 14, further comprising:
a communications interface through which to automatically transfer the microcore to a remote site.

18. The storage server as recited in claim 14, further comprising:
an exporting module to locate a dynamically-allocated object specified in the one or more microcore specifications according to an identifier provided by the results of the event.

19. The storage server as recited in claim 14, wherein at least a portion of the one or more microcore specifications is created by a debugger that locates a statically-allocated source-level object.

20. A machine-readable medium including a plurality of instructions which when executed by a machine perform a method of operating a system, the method comprising:
generating a microcore file according to a microcore specification, the microcore file being a subset of a full core dump;
dynamically defining, at runtime, a variable in the microcore specification with information provided by results of an event that triggers generation of the microcore file;
locating a memory address in a system memory of the system, the memory address assigned to an object represented by the variable; and
dumping data from a region of the system memory into the microcore file based on the memory address.

21. The machine-readable medium as recited in claim 20, wherein the method of generating a microcore file comprises:
accessing a plurality of microcore specifications;
dynamically determining, at runtime, at least one of the plurality of microcore specifications for generation of the microcore file; and
dynamically defining, at runtime, variables in the at least one of the plurality of microcore specifications using parameter strings provided by the results of the event.

22. The machine-readable medium as recited in claim 20, wherein the method further comprises:
verifying validity of the region of the system memory before dumping the data.

23. The machine-readable medium as recited in claim 20, wherein the method further comprises:
modifying, at runtime, the microcore specification to generate an updated microcore file.

24. The machine-readable medium as recited in claim 20, wherein the system is a network storage system.

25. The machine-readable medium as recited in claim 20, wherein the method further comprises:
generating the microcore file without bringing the system offline.

26. A method of operating a storage system, the method comprising:
generating a microcore file according to a microcore specification, the microcore file being a subset of a full core dump;
dynamically defining, at runtime, a variable in the microcore specification with information provided by results of an event that triggers generation of the microcore file; and
copying contents of a location in memory or storage into the microcore file as specified by the microcore specification.

27. The method as recited in claim 26 wherein the microcore specification comprises logical information of an object.

28. The method as recited in claim 26 wherein the microcore specification comprises a physical address of an object.

29. The method as recited in claim 26 wherein the microcore file comprises contents of a memory structure in the memory identified by the microcore specification.

30. The method as recited in claim 26 wherein the microcore file comprises a file or a portion thereof in the storage identified by the microcore specification.

* * * * *